J. VANDEGRIFT.
Plow.
No. 4,119. Reissued Sept. 13, 1870.
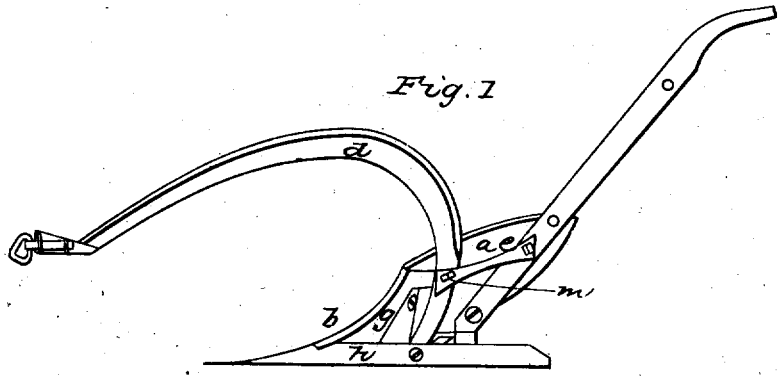
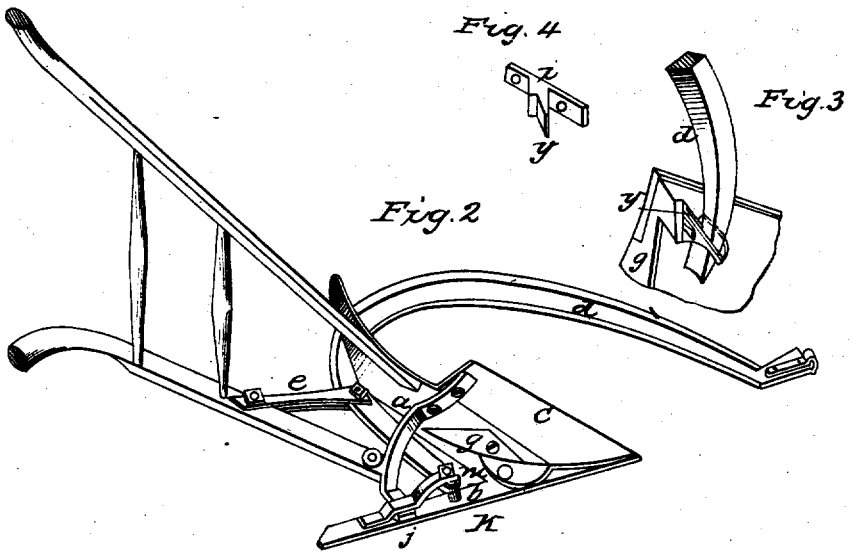
Witnesses
S. C. Kinnon
C. A. Pettit
Inventor
James Vandegrift
per Munn & Co
Attorneys
N. PETERS, Photo-Lithographer, Washington, D. C.

United States Patent Office.

JAMES VANDEGRIFT, OF PRINCETON, ILLINOIS.

*Letters Patent No.* 69,867, *dated October* 15, 1867; *reissue No.* 4,119, *dated September* 13, 1870.

IMPROVEMENT IN PLOWS.

The Schedule referred to in these Letters Patent and making part of the same

*To all whom it may concern:*

Be it known that I, JAMES VANDEGRIFT, of Princeton, in the county of Bureau and State of Illinois, have invented certain new and useful Improvements in Plows; and I do hereby declare the following to be a full, clear, and exact description of the construction and operation of the same, reference being had to the annexed drawing making a part of this specification, in which—

Figure 1 is a side view.

Figure 2, a bottom perspective view.

Figure 3, the device by which the beam of the plow is attached to its several parts, and by which the width of the furrow is regulated.

Figure 4 is a device that may be substituted for the device shown in fig. 3, and can be applied to other plows, if desired, which, by the proper adjustment thereto of the beam of the plow, regulate the width of the furrow.

Similar letters of reference indicate corresponding parts of the plow in the several figures.

The nature of this invention consists in the construction and arrangement of the plow-post, and of the method and means of attachment of the plow-beam to the plow, admitting of the adjustability of the latter, and adapting it to the purposes of taking a wider or narrower furrow, as may be desired.

To enable others skilled in the art to make and use my invention, I will proceed to describe its construction and operation.

In the accompanying drawing—

*a* represents the mold-board, *c* the share, secured together in such a manner as to be easily detached from each other when required.

*h* represents the land-side of the plow.

*g* is what I term the plow-post, and is constructed in such a manner as to conform to the shape of the mold-board *a* and its section *b*, and is firmly secured to the same and the land-side *h*.

This plow-post *g*, at its upper part, projects backward, and has formed upon it two flanges, as seen at *g'*, fig. 3, between which is or may be adjusted the curved end of the plow-beam *d*.

The plow-beam *d* is constructed, as shown in figs. 1 and 2, of iron, in a curved form, and has upon its upper edge a flange, to impart to it the necessary degree of strength. This beam is fastened to the plow in such a manner that the width of the furrow may be varied by its peculiar mode of attachment at the heel of the beam.

It is attached to the land-side *h* by means of a bolt and screw, as may be seen at *m*, the arm J being applied to the part *k*, and through which the bolt referred to passes, and secured by means of a nut.

The brace *e* aids in securing the beam *d* in its proper position, and connecting it with the handle 1 on the land-side of the plow, as seen in figs. 1 and 2. This forms a rigid attachment of the beam to the plow, and, by the peculiar construction of the beam, balances the same.

A sleeve, *k*, is applied to the beam, at the point where it is connected with the land-side *h*, by shifting which from one side to the other of the beam the line of draft is changed, in order to effect the width of the furrow; and, to aid in producing this result, the beam can also be changed at the point of attachment to the plow-post, to one side or the other of the projections formed on the post *g*.

The plow is further strengthened by means of the brace 2, fig. 2, which is securely fastened to the land-side *h*, the mold-board *a*, and share *c*, by bolts, rivets, or screws, and the same is also attached to the handle 1 by means of an eye formed upon the brace, and through which it is bolted or screwed to the handle, as shown in said fig. 2.

The device shown in fig. 4 can be attached to the mold-board *a* by means of bolts or screws, and the beam *d* applied thereto, between the projections formed thereupon.

What I claim as my invention, and desire to secure by Letters Patent, is—

1. The within-described arrangement of the beam *d*, the plow *g*, and land-side *h*, arm J, sleeve *k*, and screw-bolt *m*, operating in the manner and for the purpose herein described.

2. The construction and arrangement of the plow-post *g* with its backward-projecting flanges *g'*, when attached to the plow, as herein shown, so as to admit of the adjustment thereto of a plow-beam, in the manner and for the purpose herein described.

JAMES VANDEGRIFT.

Witnesses:

B. NEWELL,

J. K. WALDREN.